United States Patent
Majumdar (10) Patent No.: US 11,061,952 B2
(45) Date of Patent: *Jul. 13, 2021

(54) WEIGHTED SUBSYMBOLIC DATA ENCODING

(71) Applicant: KYNDI, INC., Redwood City, CA (US)

(72) Inventor: Arun Majumdar, Alexandria, VA (US)

(73) Assignee: KYNDI, INC., Redwood City, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/180,997

(22) Filed: Nov. 5, 2018

(65) Prior Publication Data

US 2019/0138541 A1    May 9, 2019

Related U.S. Application Data

(63) Continuation of application No. 14/965,573, filed on Dec. 10, 2015, now Pat. No. 10,120,933.

(Continued)

(51) Int. Cl.
*G06F 16/35* (2019.01)
*G06F 16/583* (2019.01)
(Continued)

(52) U.S. Cl.
CPC .......... *G06F 16/35* (2019.01); *G06F 16/2365* (2019.01); *G06F 16/24578* (2019.01);
(Continued)

(58) Field of Classification Search
CPC .... G06F 16/35; G06F 16/9038; G06F 16/438; G06F 16/9535; G06F 16/2246;
(Continued)

(56) References Cited

U.S. PATENT DOCUMENTS

| 6,523,026 B1 | 2/2003 | Gillis |
| 7,925,610 B2 | 4/2011 | Elbaz |

(Continued)

FOREIGN PATENT DOCUMENTS

| CN | 101021849 A | 8/2007 |
| CN | 103440348 A | 12/2013 |

(Continued)

OTHER PUBLICATIONS

Australian Office Action dated Jun. 10, 2020, in Patent Application No. 2015360472, 3 pages.

(Continued)

*Primary Examiner* — Shahid A Alam
(74) *Attorney, Agent, or Firm* — Oblon, McClelland, Maier & Neustadt, L.L.P.

(57) ABSTRACT

Described herein is a method and system of geometrically encoding data including partitioning data into a plurality of semantic classes based on a dissimilarity metric, generating a subspace formed by first and second data elements, the first and second data elements being included in first and second numbers of partitioned semantic classes, encoding the first data element with respect to the second data element such that the generated subspace formed by the first data element and the second data element is orthogonal, computing a weight distribution of the first data element with respect to the second data element, the weight distribution being performed for each of the first number of semantic classes and the second number of semantic classes, and determining a dominant semantic class corresponding to an ordered sequence of the first data element and the second data element, the dominant semantic class having a maximum weight distribution.

20 Claims, 4 Drawing Sheets

Related U.S. Application Data (60) Provisional application No. 62/090,198, filed on Dec. 10, 2014.

(51) Int. Cl.
*G06F 16/23* (2019.01)
*G06F 16/9038* (2019.01)
*G06F 16/2457* (2019.01)
*G06F 16/22* (2019.01)
*G06F 16/9535* (2019.01)

(52) U.S. Cl.
CPC .......... *G06F 16/355* (2019.01); *G06F 16/583* (2019.01); *G06F 16/9038* (2019.01); *G06F 16/2246* (2019.01); *G06F 16/9535* (2019.01)

(58) Field of Classification Search
CPC ............... G06F 16/00; G06F 17/3005; G06F 17/30867; G06F 17/30991; G06F 17/30; G06F 3/04842; G06F 17/30371; G06F 17/3053; G06F 17/30705; G06F 17/03584; G06F 17/30445; G06F 17/30569; G06F 17/30247; G06F 16/214; G06F 16/278; G06F 16/285; G06F 16/355; G06F 16/583; G06F 16/2365; G06F 16/24578; G06K 9/6269; G06N 5/02
USPC ......................................................... 707/756
See application file for complete search history.

(56) References Cited

U.S. PATENT DOCUMENTS

| | | | | |
|---|---|---|---|---|
| 8,140,539 | B1* | 3/2012 | Cohen ................. | G06F 16/2462 707/748 |
| 2002/0015526 | A1* | 2/2002 | Nomura ................ | G06T 7/0004 382/199 |
| 2005/0108001 | A1* | 5/2005 | Aarskog .............. | G06F 40/289 704/10 |
| 2006/0009963 | A1 | 1/2006 | Gaussier et al. | |
| 2007/0174270 | A1 | 7/2007 | Goodwin et al. | |
| 2007/0217676 | A1 | 9/2007 | Grauman et al. | |
| 2009/0100053 | A1 | 4/2009 | Boschee et al. | |
| 2011/0040717 | A1 | 2/2011 | Rho et al. | |
| 2012/0004887 | A1* | 1/2012 | Kawaguchi ........ | G06K 9/00355 702/150 |
| 2012/0109974 | A1* | 5/2012 | Feng .................... | G06F 40/284 707/748 |
| 2012/0233188 | A1 | 9/2012 | Majumdar | |
| 2012/0254089 | A1 | 10/2012 | Alba et al. | |
| 2012/0278321 | A1 | 11/2012 | Traub | |
| 2013/0004178 | A1* | 1/2013 | Kotzin .................. | G08C 23/04 398/106 |
| 2013/0096909 | A1 | 4/2013 | Brun | |
| 2015/0154229 | A1* | 6/2015 | An ....................... | G06F 16/583 707/728 |

FOREIGN PATENT DOCUMENTS

| | | |
|---|---|---|
| CN | 103970729 A | 8/2014 |
| CN | 104077319 A | 10/2014 |
| WO | WO 2008/037848 A1 | 4/2008 |

OTHER PUBLICATIONS

Japanese Office Action dated Oct. 29, 2019 in Patent Application No. 2017-550085 (with English translation), 7 pages.
International Search Report and Written Opinion dated Feb. 5, 2016 in PCT/US2015/064978 (with Search History).
Extended European Search Report dated Jul. 3, 2018 for European Patent Application No. 15868080.1.
Supplementary European Search Report dated Jul. 20, 2018 for European Patent Application No. 15868080.1.
Combined Chinese Office Action and Search Report dated Jan. 22, 2020, in Patent Application No. 201580073705.9, 25 pages (with English translation).
Office Action dated Jan. 13, 2021 in corresponding European Patent Application No. 15 868 080.1, 7 pages.
Indian Office Action dated Jul. 16, 2020 in Patent Application No. 201717023049, 9 pages.

* cited by examiner

WEIGHTED SUBSYMBOLIC DATA ENCODING

CROSS-REFERENCE TO RELATED APPLICATIONS

This application is a continuation of U.S. application Ser. No. 14/965,573, filed Dec. 10, 2015, which claims the benefit of priority to provisional U.S. application Ser. No. 62/090,198, filed Dec. 10, 2014, the entire contents of which are incorporated herein by reference.

BACKGROUND

Field of Disclosure

Embodiments described herein generally relate to a framework for encoding related, weighted, ordered arrangements of data as a sub-symbolic code. The sub-symbolic code provides a seamless framework for performing operations such as searching, indexing, clustering, and data transformation and/or data translation.

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High-dimensional data is difficult to encode and interpret. One approach is to simplify the data by assuming that the data of interest lies on an embedded non-linear manifold within a higher-dimensional space. If the manifold is of a low enough dimension, then the data can be visualized in the low dimensional space. However, all of the currently available data processing techniques require (and thereby assume) that the spaces are homogenous, and that only one manifold per space exist.

Furthermore, all of the currently available data processing techniques use some form of underlying proximity matrices and traditional vector space approaches such as latent semantic analysis, principle components analysis, multidimensional scaling, neural networks, as well as variants of all the preceding approaches to process the data. Moreover, a major drawback of such data processing methods is that ordered relationships between data are made as symmetric distance measurements. Thus, in the framework of such data processing techniques, the original order dependent properties of data are lost. For instance, statements like "the man bit the dog" are indiscernible from statements like "the dog bit the man".

Accordingly, there is a requirement for a framework that can represent and process data relationships in a manner, wherein the framework supports multiple manifolds in possibly heterogeneous spaces, and wherein each manifold or plurality of manifolds may have a unique attitude, orientation, and stance within the higher dimensional space.

SUMMARY

An aspect of the present disclosure provides for a framework to represent and process data relationships by implementing a geometric algebra approach, wherein multiple manifolds in possibly heterogeneous spaces can be supported. Furthermore, each manifold may have unique attitude (i.e., pitch, yaw, and roll of the manifold), orientation, and stance (i.e., relationship of a manifold with other manifolds) within the higher dimensional space.

The present disclosure provides for a technique of encoding data, wherein relationships between data are ordered and the ordered relationships are encoded based on a dissimilarity measurement of the corresponding data. Furthermore, a quarter rotation operation (i.e., a $\pi/2$ rotation) encodes the data ordering in a generalization of vector spaces, namely in the Clifford Algebra and its current variant the Geometric Algebra. In doing so, clusters of data can be viewed as members of a more general semantic class. For instance, all the words and their orderings with a particular story can be seen as a semantic class whose name is the name of the story (e.g., all stories by Sir Arthur Conan Doyle about Sherlock Holmes can be labeled with the semantic class of "Sherlock Holmes", and each story can be labeled by its title and the ordered sets of words can be seen as the manifold).

Accordingly, the present disclosure provides for a representation of data that can easily distinguish between statements such as "the man bit the dog" and the "the dog bit the man", as well as distinguish semantic classes, and thereby provide a capability to interpret and analogize data between and among semantic classes seen as geometric forms. It must be appreciated that the present disclosure is not limited to data of any particular kind. Rather, features of data encoding process described herein can be used to encode image data, linguistic data, medical data, or any kind of data for which order preservation and pattern based computing (such as search or analogy finding) is desirable.

According to one embodiment there is described a method of geometrically encoding data, the method being performed by circuitry included in a computing device, the method includes partitioning data into a plurality of semantic classes based on a dissimilarity metric, generating, based on the plurality of partitioned semantic classes, a subspace formed by a first data element and a second data element, the first data element being included in a first number of partitioned semantic classes, and the second data element being included in a second number of partitioned semantic classes, encoding by circuitry, the first data element with respect to the second data element such that the generated subspace formed by the first data element and the second data element is orthogonal, the encoding being performed for each semantic class of the first number of semantic classes relative to each semantic class of the second number of semantic classes that is not equal to the each semantic class of the first number of semantic classes, computing by circuitry, a weight distribution of the first data element with respect to the second data element, the weight distribution being performed for each of the first number of semantic classes and the second number of semantic classes, and determining a dominant semantic class corresponding to an ordered sequence of the first data element and the second data element, the dominant semantic class having a maximum weight distribution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Referring now to the drawings, wherein like reference numerals designate identical or corresponding parts throughout the several views. Accordingly, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Figure 1:
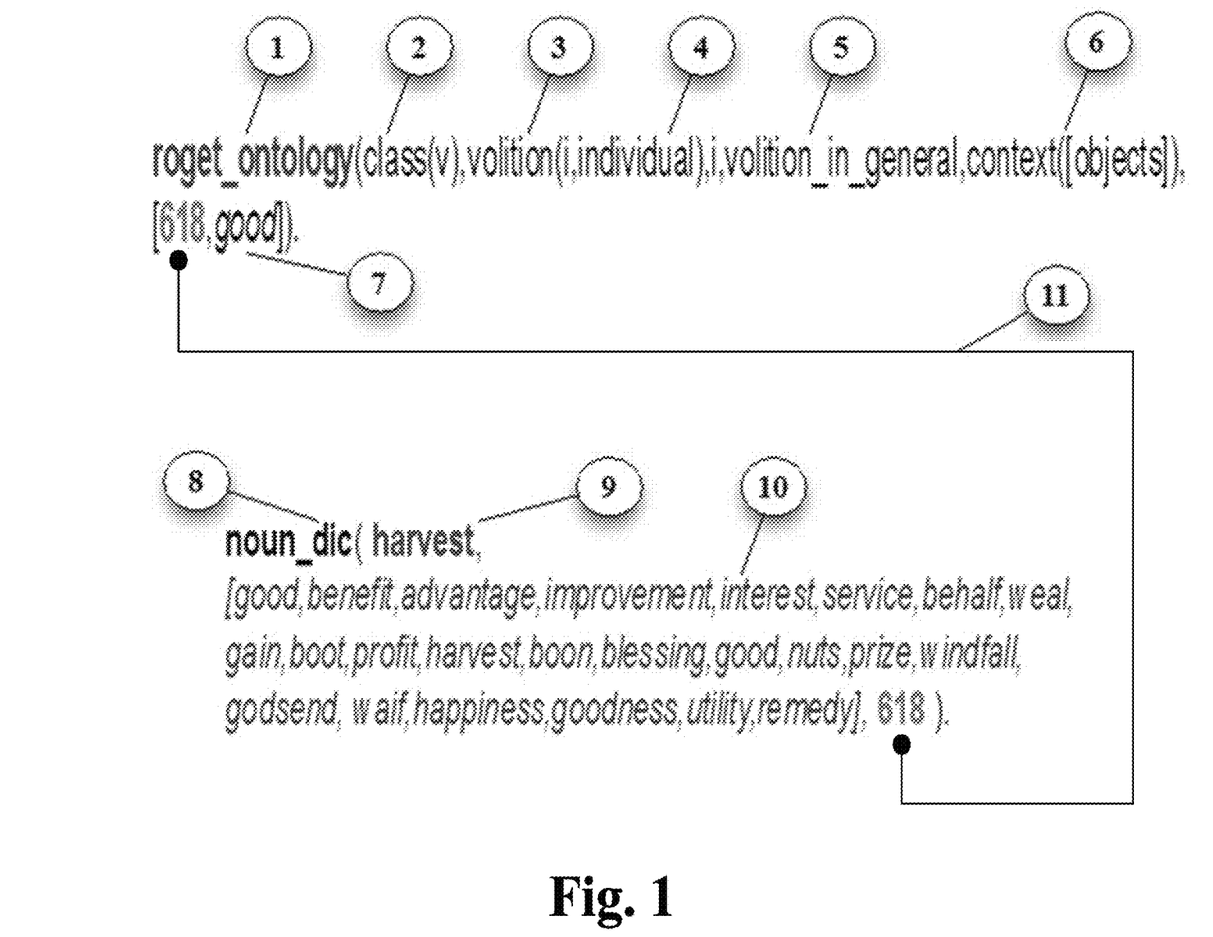
FIG. 1 illustrates an exemplary data representation and partitioning using Roget's Thesaurus.

Turning to FIG. 1 is illustrated an exemplary data representation and partitioning using Roget's Thesaurus. Roget's Thesaurus is composed of six primary classes. Each class is composed of multiple divisions, wherein each division may further include section(s). Each class may be conceptualized as a tree containing over a thousand branches for individual "meaning clusters" or semantically linked words. Although these words are not strictly synonyms, they can be viewed as colors or connotations of a meaning or as a spectrum of a concept. One of the most general words is chosen to typify the spectrum as its headword, which labels the whole group.

Specifically, Roget's Thesaurus is composed of the following six classes: class I—words expressing abstract relations; class II—words relating to space; class III—words relating to matter; class IV—words relating to the intellectual faculties; class V—words relating to the voluntary powers, individual and inter-social volition; and class VI—words relating to the sentiment and moral powers.

FIG. 1 depicts a root ontology (labeled 'roget_ontology', (1)), for class V (i.e., words relating to the voluntary powers, individual and inter-social volition, labelled as (2)). The class includes subspaces (3)-(6) that are labelled volition, individual, volition in general, and context, respectively. Additionally, FIG. 1 depicts a headword 'harvest', labelled (9) under the category of nouns (8). Specifically, as described later, by one embodiment, the word 'harvest' may corresponds to a semantic class than includes a list of data set elements (10). The list of entries in the semantic class (10) can be identified and used for further processing by its allocated case index 618.

The word 'harvest' (9) characterizes the depicted spectrum of words which includes the word 'interest' (10). Accordingly, Roget's Thesaurus provides a framework, wherein sub-spaces can be represented in a seamless manner within an aggregate space, and furthermore provides a mechanism to distribute the data set elements (identified by the corresponding case index 618) within the sub-spaces as shown by the connection (11). Specifically, as stated previously, the data elements of 618, although not strictly synonyms of the word 'good' (7), can be viewed as connotations of a meaning or as a spectrum of a concept.

According to one embodiment of the present disclosure, data can be partitioned using dissimilarity by referring to ontology or dictionary, an annotated scheme, or any other means to identify dissimilarity between the data. It must be appreciated that data to data relationships, on the other hand, express underlying semantic class relationships and are defined by how the most dissimilar part of one semantic class can be taken out of the most dissimilar part of another semantic class such that what remains is the dissimilarities of memberships between the data as related to either semantic class through an anti-symmetric weighted measurement (i.e. metric) between them.

Specifically, by one embodiment, a cluster analysis technique can be implemented to partition data. Cluster analysis is an unsupervised learning technique used for classification of data. The data elements are partitioned into groups called clusters that represent proximate collections of data elements based on a distance or dissimilarity function. Identical element pairs have zero distance or dissimilarity, and all others have a positive distance or dissimilarity. Furthermore, as shown in Table I, it must be appreciated that data that is to be partitioned can be a list of data elements, or rules indexing elements and labels.

TABLE I

| Different ways to partition data | |
|---|---|
| $\{e_1, e_2, e_3, \ldots e_k\}$ | data specified as a list of data elements $e_i$ |
| $\{e_1 \to v_1, e_2 \to v_2, \ldots, e_k \to v_k\}$ | data specified as a list of rules between data elements $e_i$ and labels $v_i$ |
| $\{e_1, e_2, \ldots, e_k\} \to \{v_1, v_2, \ldots, v_k\}$ | data specified as a rule mapping data elements $e_i$ to labels $v_i$ |

Furthermore, as stated previously, the clustering technique can be applied to any set of data. Note however, that a measure is required to characterize how far apart each element in a particular set is from the other elements. Such a measure corresponds to a weighted measurement between a pair of data elements. Specifically, a function that generates the distance between the data elements is required, which may be determined based on the type of data.

For instance, for numerical data elements, the functions may be one of a Euclidean distance, Manhattan distance, Chessboard distance, Bray-Curtis distance, Cosine distance, Correlation distance, and the like. In a similar manner, for boolean type of data, the distance functions may be one of Matching dissimilarity function, Jaccard dissimilarity, Yule Dissimilarity, Russell-Rao Dissimilarity, Dice Dissimilarity, and the like, whereas for a string type of data elements, the distance functions may be one of a Edit distance function, a Hamming distance function, a Damerau-Levenshtein distance function and the like.

According to one embodiment, a preferred mechanism to partition the data based on a dissimilarity metric can be performed by a data clustering mechanism as described in U.S. patent application Ser. No. 13/418,021, which is incorporated herein by reference in its entirety.

In geometric algebra, higher-dimensional oriented sub-spaces of a space V, referred to herein as 'blades' are basic elements of computation. Furthermore, in the present disclosure, the term k-blade is used to denote a k-dimensional homogeneous subspace. The outer product of vectors $a1 \wedge a2 \ldots \wedge ak$ is anti-symmetric, associative and linear in its arguments. The outer product is denoted as $a1 \wedge a2 \wedge a3 \ldots \wedge ak$, and referred to as a k-blade. It must be appreciated that the outer product of vectors is different from a general determinant computation of vectors in that, the outer product is not forced to be scalar-valued quantity and thereby, the outer product has the capability of representing the 'attitude' (i.e., pitch, roll and yaw parameters of the vector) and orientation of a k-dimensional subspace element, as well as its magnitude within its higher dimensional space.

It must be appreciated that the outer product gives computational meaning to the notion of 'spanning subspaces'. The geometric nature of blades indicates that there are relationships between the metric measures of different grades (i.e. between multi-vectors). Thus, a contraction product on vectors corresponds to a relationship between blades that is not symmetric, and is not associative as shown by following definition: $(A \wedge B)*C = A*(B\_|C)$ for all C, where * is the geometric scalar product and $\_|$ is the left-contraction product. It must be appreciated that the definition could also be written in the dual form by using the right contraction product "$|\_$". According to one embodiment, the contraction product includes a $\pi/2$ rotation (i.e. a quarter turn) and because rotations are anti-commutative, this property can be used to represent the ordering in data, as sequences of rotations.

Figure 2:
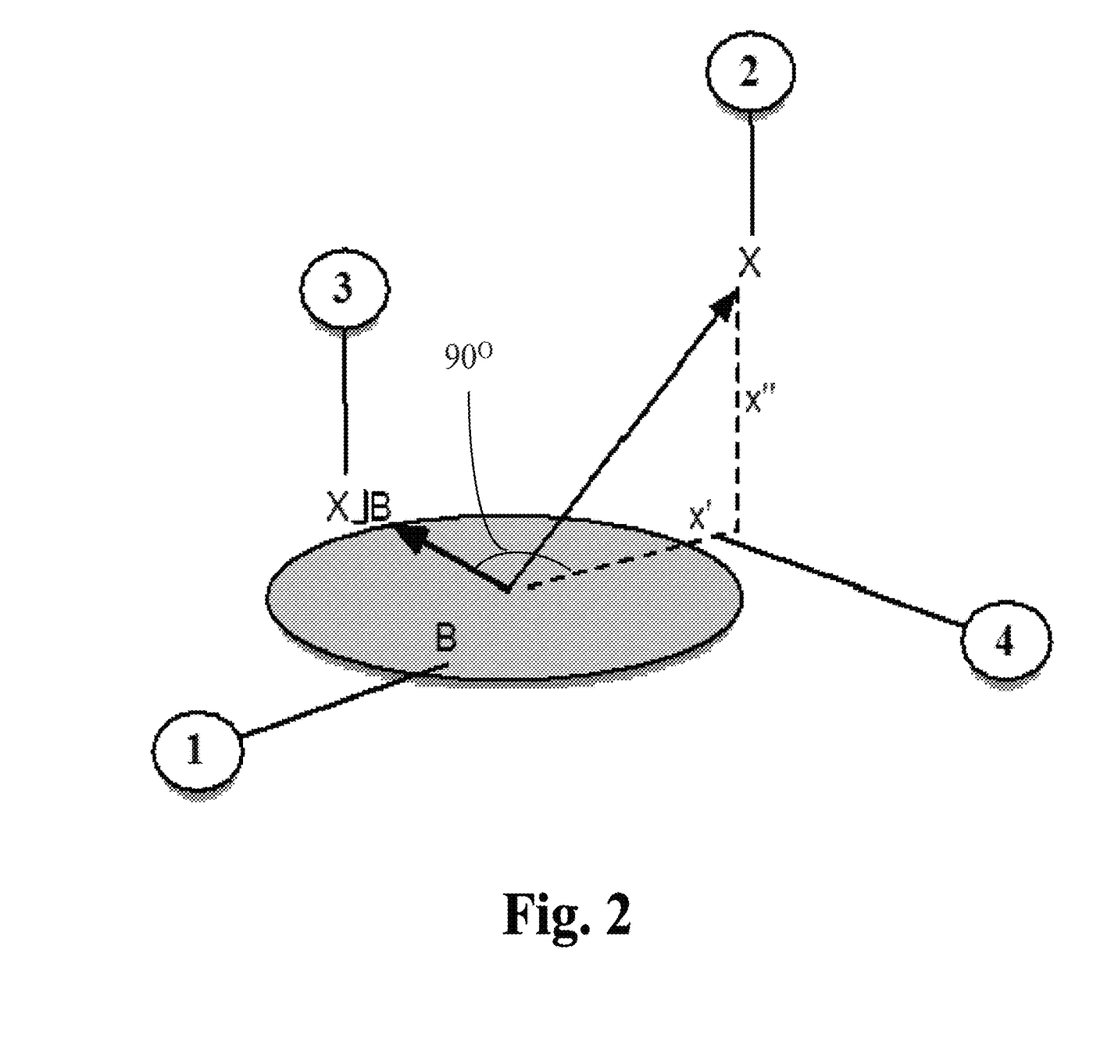
FIG. 2 illustrates according to one embodiment a contraction product between a vector and a bivector.

Turning now to FIG. 2 is illustrated according to one embodiment, a contraction product between a vector and a bivector. Note that a bivector is formed by performing an outer product operation on two vectors. The bivector can be interpreted as an oriented plane segment. For instance, the bivector $a \wedge b$ has a magnitude equal to the area of the parallelogram with edges a and b, has the attitude of the plane spanned by a and b, and has an orientation being the sense of the rotation that would align a with b.

Specifically, referring to FIG. 2, the plane B (labelled (1)), represents a bivector that is formed by an outer product operation of two vectors. Further, the vector X (labelled (2)), represents a vector in a higher dimensional space. X' (labelled (4)), and X'' correspond to the horizontal and vertical projections of vector X. Note that as illustrated in FIG. 2, the horizontal projection X', of the vector X, lies in the plane of the bivector. The contraction product of the vector X and the bivector B (represented as X_|B) and labelled as (3), is orthogonal to the projection X'.

Note the as shown in FIG. 2, the symbol '_|' denotes the contraction inner product. For arbitrary multi-vectors a, b, and c and scalars $\lambda$ and $\beta$, the following set of laws and axioms apply:

Scalar Inner Product:

$\lambda\_|\beta = \lambda\beta$

Vector and Scalar:

$a\_|\beta = 0$

Scalar and Vector:

$\lambda\_|b = \lambda b$

Vectors:

$a\_|b = ab$

Vectors and Multi-Vectors $a\_|(b \wedge C) = (a\_|b)\char`\^c - b \wedge (a\_|C)$ Distribution Law $(a \wedge b)\_|c = a \wedge (b\_|c)$ Note that when one applies the inner product onto two vectors, the result is exactly the same as a dot product in linear algebra. However, when one takes higher grade blades and applies the inner product the result is a reduction in the grade of the blade.

According to one embodiment, each cluster represents a collection of data. Further, each data may occur in multiple clusters. Each data is treated as a distribution (i.e. weight) over the collection of clusters. Specifically, each cluster is a basis blade in geometric algebra. For instance, in encoding dictionaries and resources such as WordNet or Roget's Thesaurus, and other similar text resources, a cluster corresponds to a synonym set, referred to herein as 'synset', in which words share the same kind of meaning. Additionally, clusters can be divided into types, such as nouns, verbs, or adjectives, and each cluster can be further divided into synsets. According to one embodiment, the following correspondences as outlined in Table II may be utilized:

TABLE II

Relationship between cluster, blade, and synset.

Cluster = Basis blade = Any grouping of synsets of any type
Data is a subspace of the basis blade = Words of the synset As stated previously, an example of data clusters with specific and important semantic orientation (i.e. in the ordering of words as data) can be found in any thesaurus, ontology or dictionary. In order to use the methods of the present disclosure (described later with reference to FIG. 4), the data is partitioned in order to build the basis blades using such clusters as the grammatical types and synsets. Accordingly, by one embodiment, the correspondences illustrated in Table II can be elaborated as shown below in Table III.

TABLE II

Correspondences between cluster, semantic class basis blade, and word.

Cluster = Semantic class
Word is oriented in the semantic class
Semantic class = Basis blade
Word is a subspace of the basis blade Accordingly, by one embodiment of the present disclosure, a basis blade is determined by a word, its relative position in a cluster and the semantic class assigned to the cluster. Note that it must be ensured that the blades are non-degenerate (i.e. have orthogonal components). Thus, each contraction product requires a metric to be defined or supplied by the user (such as Jaccard metric, Dice coefficient, cosine metric or other similar choices).

By one embodiment, the inner product between a vector 'a' and a bivector 'B', where the bivector is formed by an outer product of vectors 'b' and 'c' (i.e., $B = b \char`\^ c$), the following properties hold:

left-contraction: $a\_|B = \frac{1}{2}[aB - Ba]$ right-contraction: $B|\_a = \frac{1}{2}[Ba - aB]$ and: $a\_|B = -B|\_a$ Note that a·n is the zero-grade part of the geometric product. The grade of a·b is the difference of the grades of a and b. By extrapolating this property, the inner product between a and B, whose grade is the geometric product aB, whose grade is the difference of the grades of a and B. The left contraction is the antisymmetric part of the geometric product aB and the right contraction is the antisymmetric part of Ba. Thus, in order to evaluate the left contraction a_|B of a bi-vector B=b^c with the vector a in practice, the contraction must be expressed in terms of the products which are known. To this end, the contraction and outer products can be expressed in terms of the geometric product to obtain: a_|b^c=a·bc−a·cb.

As illustrated in the non-limiting of FIG. 2, note that a_|b^c is a vector, which lies in the b^c plane and is orthogonal to the vector 'a'. The geometric significance of the a_|b^c is that 'a' is a vector, which can be obtained by rotating the orthogonal projection of 'a' in the plane b^c by a quarter turn and further dilating the result by 'bc'. Thus, by one embodiment, the contraction product correspond to proxies for Rotor transforms and for those skilled in the art, one can show that the components of the vector under the contraction product of a vector and bi-vector can be built as a quarter turn rotor in a sandwich product (i.e. for rotor, R, and vector, v, we have the sandwich product RvR) with the component of the vector in the plane of the bivector.

By one embodiment, the various distance functions of the present disclosure are embedded into the computation of the contraction to obtain a metric as follows: since the geometric algebra has $2^N$ blades, for any algebra of N-dimensions, it follows that we can utilize $2^N$ binary bits to represent the blades, or in using a conformal model, one can utilize $2^{(N+2)}$ bits. Therefore, it follows that we can utilize binary bit-vector codes within the geometric algebra to represent the exterior product parts together with distance functions such as the Jaccard distance, Dice coefficient, Hamming or Manhattan metric and the like to represent the metric part for the inner, contraction product.

According to one embodiment, two subspaces are related by a semantic distance (SD), if their embedded data 'correlate' or 'associate', respectively according to their presence within a subspace and the distance measures computed from their source blades (i.e. the clusters from which they originate). When two subspaces differ, the t-norm can be computed to establish similarity. The t-norm product and minimum can be computed by Lukasiewicz t-norms methods. Accordingly, considering a sentence as a subspace, by one embedment, one can express the semantic measure between two sentences and relate between the semantic classes that have maximal measure to provide analogies based on their classes.

For instance, using the Roget 1911 Thesaurus as a source, and by encoding the well-known thesaurus in the data representation system and method of the present disclosure, the computation between "young girl" and "pretty flower" produces the semantic class result as "youth and beauty" as the relationship between the two input sentences.

Additionally, if in multiple different clusters there are data points with identical labels, for example, the word "bank" in one cluster also occurs in other clusters, respectively in particular meanings, then these meanings can be distinguished when a subspace is formed by other data in relative ordering, since the context becomes equivalent to the semantic class that classifies the sentence in which the word is used.

For instance, the word "bank" used in a sentence with other words as: "the teller at the bank took the deposit in cash" produces a different projection of bank than in the sentence "the fisherman cast his line from bank into the river". Also certain data, which are unique to a cluster, indicate that this data is being used in only one particular meaning. Furthermore, the word "bank" in the English language clearly has various meanings, such as: financial institution, lateral inclination, ground beside a river, movement of an airplane, a shot in game of billiards, and the like, but if in a particular sentence it appears together with other words, then the contraction products, based on the influence of the spaces from which the other words originate, will produce the different contexts (i.e. subspace orientations) as output so that a word like "bank" can be distinguished contextually from whether or not it occurs for a context of money or a river.

Figure 3:
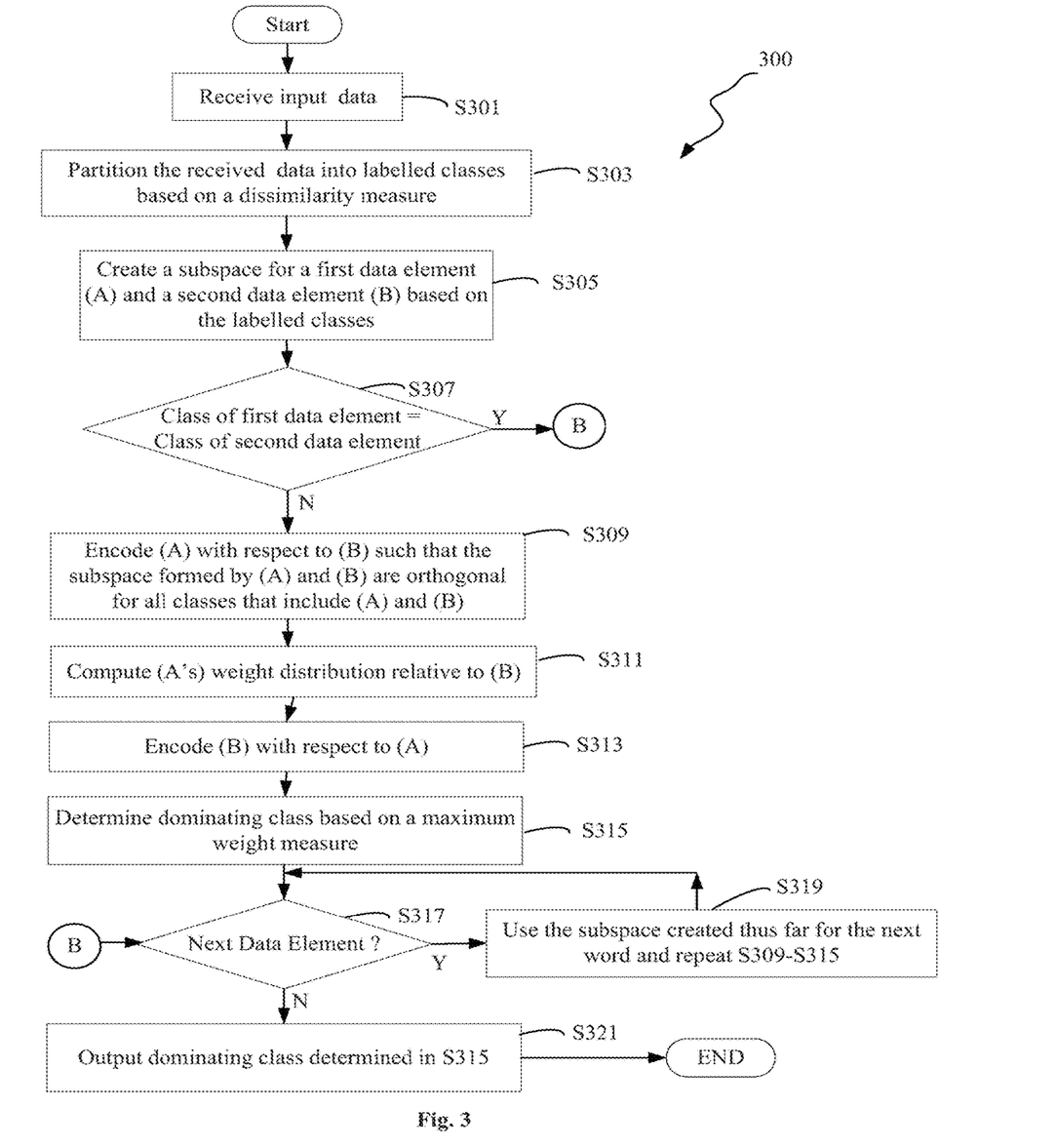
FIG. 3 illustrates a flowchart depicting the steps performed to encode weighted ordered data.

In what follows, a description of a process 300 of geometrically encoding data by the contraction technique is described in detail with reference to FIG. 3. According to one embodiment, the process described in FIG. 3 can be implemented on a computing device that includes one or more special purpose processing circuits (described later with reference to FIG. 4).

The process 300 commences in step S301, wherein input data received by the computing device is partitioned into semantic classes based on a dissimilarity metric (step S303). As stated previously, any one of the cluster analysis techniques may be utilized to generate the semantic classes.

The process proceeds to step S305, wherein based on the partitioned semantic classes, a subspace is created for a first data element (A), and a second data element (B). For instance, considering that the first data element A belongs to a partitioned set X of a semantic class (MA), the synonym set (i.e., synset/blades created in step S303) of A is obtained from all the classes (created in step S303) that A is a member of. For instance, considering the first data element to be the word 'bank', the synset for bank is obtained from all classes that 'bank' is member of, such as the classes 'financial institution', 'geographic features' and the like. In a similar manner, the synset for the second data element (B) is also obtained from all the classes that B is a member of.

The process then proceeds to step S307, wherein a query is made to determine whether the first data element and the second data element belong to the same semantic class. If the response to the query is affirmative, the process moves to step S317. If the response to the query is negative, then the process proceeds to step S309. By one embodiment, performing the query of step S307 provides the advantageous ability of ensuring that the blades are non-degenerate (i.e. have orthogonal components).

The process in step S309, encodes the first data element (A) with respect to the second data element (B), such that the subspace formed by (A) and (B) are orthogonal for all sematic classes that include (A) and (B), respectively. By one embodiment, the first data element (A) is encoded with respect to the second data element (B) by computing, for (A) preceding (B) (i.e. having (A) as a successor of (B), represented as S(A)), the quantity S(A)=A*(X_|Y), for the semantic class of A relative to the semantic class of B, for all classes that (A) and (B) occur in. Specifically, S(A) is computed as a scalar multiple of the left contraction of set X and set Y.

The process then proceeds to step S311, wherein a weight (represented as WT(A)) for the first data element (A) preceding the second data element (B) is computed as follows: WT(A)=A*(MA_|MB). Specifically, in step S311, a weight distribution of (A) with respect (B) is computed, i.e. a scalar multiple of the left contraction of the semantic class MB and semantic class MA. By one embodiment, the weight of (A)

with respect to (B) can be computed by determining the number of elements in each of the semantic classes.

The process then proceeds to step S313, wherein the second data element (B) is encoded with respect to the first data element (A). By one embodiment, the encoding of (B) with respect to (A) can be performed in a manner similar to that described above of encoding (A) with respect to (B).

Thereafter, the process in step S315, determines a dominating semantic class based on a maximum weight measure that is computed in step S3111. Specifically, a maximum measure for the outcomes of the weights is determined, in order to select the corresponding semantic class, as the dominating class that entails the context for the sequence 'AB'. For example, if the sequence AB is "lending bank" or "financial bank", then the dominating semantic class which includes the word 'bank' is determined to be 'financial institutions'. In contrast if the sequence AB is "river bank", then the dominating semantic class which includes the word 'bank' is determined to be 'geographic feature'.

Further, in step S317, a query is made to determine whether there exists a next data element (C) that is to be processed. If the response to the query in step S317 is affirmative, then the process moves to step S319, wherein the subspace created thus far S(AB) is used to process the next data element (C), so that the ordering ABC becomes S(AB)S(C). In other words, the process depicted in steps S309-S315 is repeated for the data element (C), whereafter, the process comes to step S317 to determine if another data element exists.

If the response to the query in step S317 is negative, the process moves to step S321, wherein the dominating class computed thus far is output, whereafter the process 300 terminates.

As stated previously, each of the functions of the above described embodiments may be implemented by one or more processing circuits. A processing circuit includes a programmed processor (for example, processor 403 in FIG. 4), as a processor includes circuitry. A processing circuit also includes devices such as an application-specific integrated circuit (ASIC) and conventional circuit components arranged to perform the recited functions. The circuitry may be particularly designed or programmed to implement the above described functions and features which improve the processing of the circuitry and allow data to be processed in ways not possible by a human or even a general purpose computer lacking the features of the present embodiments.

Figure 4:
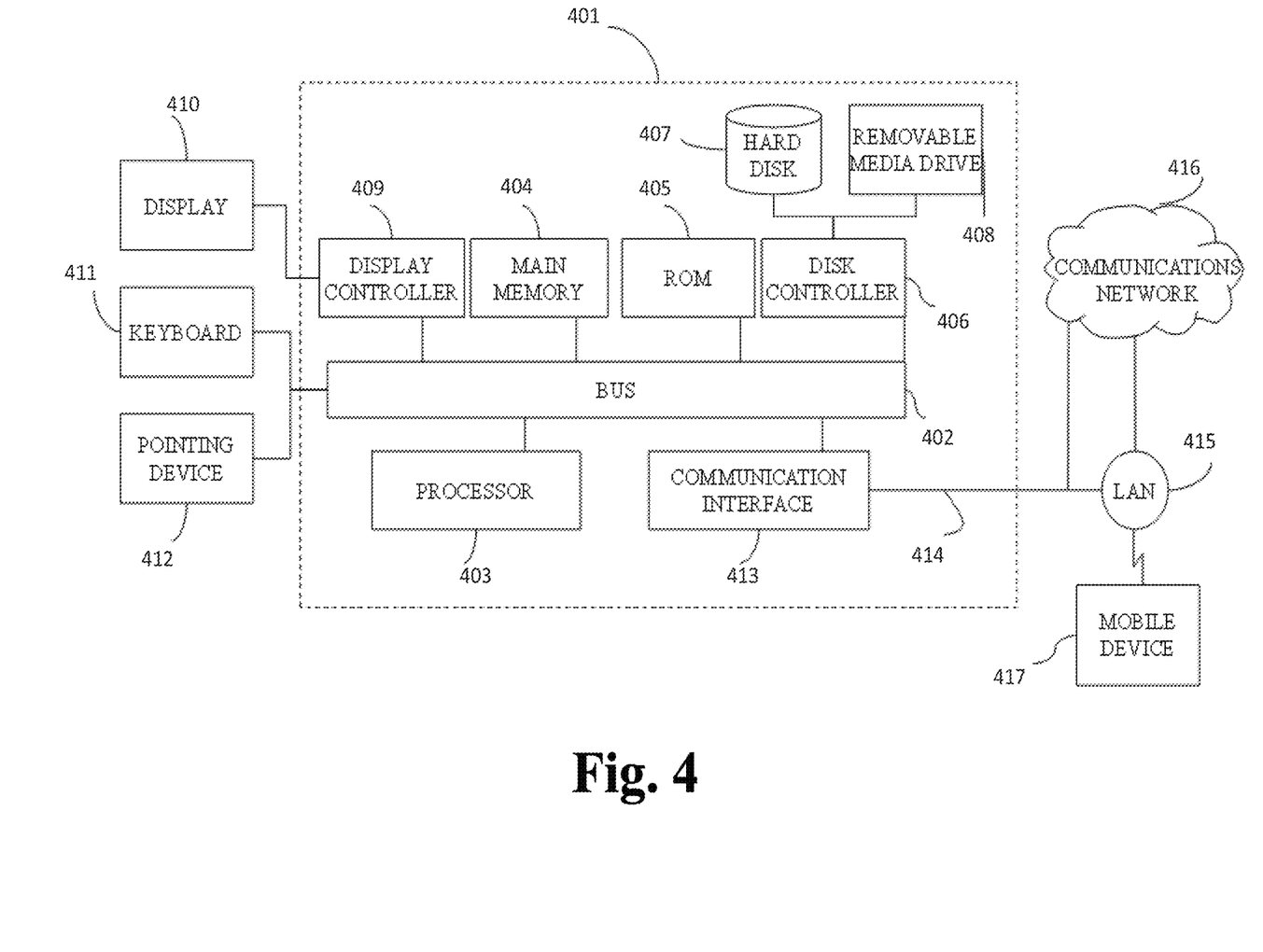
FIG. 4 illustrates a block diagram of a computing device according to one embodiment

The various features discussed above may be implemented by a computing device such as a computer system (or programmable logic). FIG. 4 illustrates such a computer system 401. The computer system 401 of FIG. 4 may be a particular, special-purpose machine. In one embodiment, the computer system 401 is a particular, special-purpose machine when the processor 403 is programmed to compute vector contractions.

The computer system 401 includes a disk controller 406 coupled to the bus 402 to control one or more storage devices for storing information and instructions, such as a magnetic hard disk 407, and a removable media drive 408 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 401 may also include a display controller 409 coupled to the bus 402 to control a display 410, for displaying information to a computer user. The computer system includes input devices, such as a keyboard 411 and a pointing device 412, for interacting with a computer user and providing information to the processor 403. The pointing device 412, for example, may be a mouse, a trackball, a finger for a touch screen sensor, or a pointing stick for communicating direction information and command selections to the processor 403 and for controlling cursor movement on the display 410.

The processor 403 executes one or more sequences of one or more instructions contained in a memory, such as the main memory 404. Such instructions may be read into the main memory 404 from another computer readable medium, such as a hard disk 407 or a removable media drive 408. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 401, for driving a device or devices for implementing the invention, and for enabling the computer system 401 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 403 for execution. A computer readable medium may take many forms, including but not limited to, non-volatile media or volatile media. Non-volatile media includes, for example, optical, magnetic disks, and magneto-optical disks, such as the hard disk 407 or the removable media drive 408. Volatile media includes dynamic memory, such as the main memory 404. Transmission media, on the contrary, includes coaxial cables, copper wire and fiber optics, including the wires that make up the bus 402. Transmission media also may also take the form of acoustic or light waves, such as those generated during radio wave and infrared data communications.

Various forms of computer readable media may be involved in carrying out one or more sequences of one or more instructions to processor 403 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 401 may receive the data on the telephone line and place the data on the bus 402. The bus 402 carries the data to the main memory 404, from which the processor 403 retrieves and executes the instructions. The instructions received by the main memory 404 may optionally be stored on storage device 407 or 408 either before or after execution by processor 403.

The computer system 401 also includes a communication interface 413 coupled to the bus 402. The communication interface 413 provides a two-way data communication coupling to a network link 414 that is connected to, for example, a local area network (LAN) 415, or to another communications network 416 such as the Internet. For example, the communication interface 413 may be a network interface card to attach to any packet switched LAN. As another example, the communication interface 413 may be an integrated services digital network (ISDN) card. Wireless links may also be implemented. In any such implementation, the communication interface 413 sends and receives electrical, electromagnetic or optical signals that carry digital data streams representing various types of information.

The network link 414 typically provides data communication through one or more networks to other data devices. For example, the network link 414 may provide a connection to another computer through a local network 415 (e.g., a LAN) or through equipment operated by a service provider, which provides communication services through a communications network 416. The local network 414 and the communications network 416 use, for example, electrical, electromagnetic, or optical signals that carry digital data streams, and the associated physical layer (e.g., CAT 5 cable, coaxial cable, optical fiber, etc.). The signals through the various networks and the signals on the network link 414 and through the communication interface 413, which carry the digital data to and from the computer system 401 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 401 can transmit and receive data, including program code, through the network(s) 415 and 416, the network link 414 and the communication interface 413. Moreover, the network link 414 may provide a connection through a LAN 415 to a mobile device 417 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. Furthermore, it should be noted that, as used in the specification and the appended claims, the singular forms "a," "an," and "the" include plural referents unless the context clearly dictates otherwise.

The invention claimed is:

1. A method of geometrically encoding data; the method being performed by circuitry included in a computing device, the method comprising:
   partitioning data into a plurality of semantic classes based on a dissimilarity metric;
   generating, based on the plurality of partitioned semantic classes, a subspace formed by a first data element and a second data element, the first data element being included in a first number of partitioned semantic classes, and the second data element being included in a second number of partitioned semantic classes;
   encoding by circuitry, the first data element with respect to the second data element such that the generated subspace formed by the first data element and the second data element is orthogonal, the encoding being performed for each semantic class of the first number of semantic classes relative to each semantic class of the second number of semantic classes that is not equal to the each semantic class of the first number of semantic classes, and the encoding being performed b computing one of a left contraction and a right contraction of the first data element with respect to the second of data element, wherein the left contraction is one of a Clifford Algebra left contraction and a Geometric Algebra left contraction, and the right contraction is one of a Clifford Algebra right contraction and a Geometric Algebra right contraction;
   computing by circuitry, a weight distribution of the first data element with respect to the second data element, the weight distribution being performed for each of the first number of semantic classes and the second number of semantic classes; and
   determining a dominant semantic class corresponding to an ordered sequence of the first data element and the second data element, the dominant semantic class having a maximum weight distribution.

2. The method of claim 1, wherein partitioning the data into the plurality of semantic classes further comprises:
   computing the dissimilarity metric by determining a semantic distance between the first data element and the second data element, the semantic distance being based on a fixed distance between a top layer and a bottom layer of an ontology of the data.

3. The method of claim 1, wherein
   each semantic class of the one or more second semantic classes is different than each semantic class of the one or more first semantic classes.

4. The method of claim 1, wherein the encoding further comprises:
   computing a first metric corresponding to the first data element being a successor of the second data element, the first metric being computed as a geometric product of the subspace of the first data element with the computed one of the left contraction operation and the right contraction operation of the first set of data elements with respect to the second set data, elements.

5. The method of claim 1, wherein the weight distribution of the first data element with respect to the second data element is computed as a geometric product of one of the left contraction operation and the right contraction operation of each of the one or more first semantic classes with respect to each of the one or more second semantic classes.

6. The method of claim 5, wherein the weight distribution associated with one of the left contraction operation and the right contraction operation of each of the first semantic classes with respect to each of the one or more second semantic classes includes one of a Jaccard metric, Dice coefficient metric, Hamming Distance metric, Manhattan metric, and a Cosine metric as a distance measure within respective blades of the graded vector space.

7. The method of claim 1, wherein, for an ordered pair of a first semantic class of the one or more first semantic classes with a second semantic class of the one or more second semantic classes, the component of the weight distribution of the first data element with respect to the second data element is based on a number of common data elements that occur both in the first semantic class and in the second semantic class.

8. The method of claim 1, wherein the partitioning further comprises:
generating a plurality of data clusters, each data cluster including at least one semantic class of the plurality of semantic classes, and wherein substantially similar data elements are assigned to a data cluster, and the plurality of semantic classes correspond to respective blades of the blades of the graded vector space.

9. The method of claim 1, wherein types of the plurality of semantic classes include one or more of data clusters, parts of speech, a language synonym set, and an ontology.

10. The method of claim 1, wherein the determining further comprises:
repeating the encoding and the computing, for the second data element being a successor of the first data element.

11. The method of claim 8, wherein each semantic class belonging to a data cluster of the plurality of data clusters corresponds to a blade of the blades, which is a heterogeneous space formed by the plurality of data clusters.

12. The method of claim 1, wherein each type of semantic class of the plurality of semantic classes is assigned a unique metric, the unique metric being utilized in the computation of one of the left contraction and a right contraction operations as a measure within one of the respective blades.

13. A device for language processing that represents both sematic and orientation content within a text, the device comprising:
circuitry configured to:
partition data into a plurality of semantic classes based on a dissimilarity metric;
generate, based on the plurality of partitioned semantic classes, a subspace formed by a first data element and a second data element, the first data element being included in a first number of partitioned semantic classes, and the second data element being included in a second number of partitioned semantic classes;
encode the first data element with respect to the second data element such that the generated subspace formed by the first data element and the second data element is orthogonal, the encoding being performed for each semantic class of the first number of semantic classes relative to each semantic class of the second number of semantic classes that is not equal to the each semantic class of the first number of semantic classes, and the encoding being performed by computing one of a left contraction and a right contraction of the first data element with respect to the second of data element, wherein the left contraction is one of a Clifford Algebra left contraction and a Geometric Algebra left contraction, and the right contraction is one of a Clifford Algebra right contraction and a Geometric Algebra right contraction;
compute a weight distribution of the first data element with respect to the second data element, the weight distribution being performed for each of the first number of semantic classes and the second number of semantic classes; and
determine a dominant semantic class corresponding to an ordered sequence of the first data element and the second data element, the dominant semantic class having a maximum weight distribution.

14. The device of claim 13, Therein when partitioning the data into the plurality of semantic classes, the circuitry is further configured to:
compute the dissimilarity metric by determining a semantic distance between the first data element and the second data element, the semantic distance being based on a fixed distance between a top layer and a bottom layer of an ontology of the data.

15. The device of claim 13, wherein
each semantic class of the one or more second semantic classes is different than each semantic class of the one or more first semantic classes.

16. The device of claim 13, wherein when encoding the first data element, the circuitry is further configured to:
compute a first metric corresponding to the first data element being a successor of the second data element, the first metric being computed as a geometric product of the subspace of the first data element with the computed one of the left contraction operation and the right contraction operation of the first set of data elements with respect to the second set data elements.

17. The device of claim 13, wherein the weight distribution of the first data element with respect to the second data element is computed as a geometric product of one of the left contraction operation and the right contraction operation of each of the one or more first semantic classes with respect to each of the one or more second semantic classes.

18. The device of claim 17, wherein the weight distribution associated with one of the left contraction operation and the right contraction operation of each of the first semantic classes with respect to each of the one or more second semantic classes includes one of a Jaccard metric, Dice coefficient metric, Hamming Distance metric, Manhattan metric, and a Cosine metric as a distance measure within respective blades of the graded vector space.

19. The device of claim 13, wherein, for an ordered pair of a first semantic class of the one or more first semantic classes with a second semantic class of the one or more second semantic classes, the component of the weight distribution of the first data element with respect to the second data element is based on a number of common data elements that occur both in the first semantic class and in the second semantic class.

20. A non-transitory computer-readable medium storing instructions that, when executed by one or more processors of a device, cause the device to:
partition data into a plurality of semantic classes based on a dissimilarity metric;
generate, based on the plurality of partitioned semantic classes, a subspace formed by a first data element and a second data element, the first data element being included in a first number of partitioned semantic classes, and the second data element being included in a second number of partitioned semantic classes;

encode the first data element with respect to the second data element such that the generated subspace formed by the first data element and the second data element is orthogonal, the encoding being performed for each semantic class of the first number of semantic classes relative to each semantic class of the second number of semantic classes that is not equal to the each semantic class of the first number of semantic classes, and the encoding being performed by computing one of a left contraction and a right contraction of the first data element with respect to the second of data element, wherein the left contraction is one of a Clifford Algebra left contraction and a Geometric Algebra left contraction, and the right contraction is one of a Clifford Algebra right contraction and a Geometric Algebra right contraction;

compute a weight distribution of the first data element with respect to the second data element, the weight distribution being performed for each of the first number of semantic classes and the second number of semantic classes; and determine a dominant semantic class corresponding to an ordered sequence of the first data element and the second data element, the dominant semantic class having a maximum weight distribution.

\* \* \* \* \*